(12) United States Patent
Chung et al.

(10) Patent No.: US 11,576,242 B1
(45) Date of Patent: Feb. 7, 2023

(54) LED ILLUMINATION DEVICE FOR IMPROVING ANTI-SURGE CAPABILITY

(71) Applicant: PARAGON SEMICONDUCTOR LIGHTING TECHNOLOGY CO., LTD., New Taipei (TW)

(72) Inventors: Chia-Tin Chung, Miaoli County (TW); Pei-Chun Liu, New Taipei (TW); Yi-Chun Liu, New Taipei (TW)

(73) Assignee: PARAGON SEMICONDUCTOR LIGHTING TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/730,135

(22) Filed: Apr. 26, 2022

(30) Foreign Application Priority Data

Feb. 17, 2022 (TW) .................................. 111201636

(51) Int. Cl.
*H05B 45/50* (2022.01)
*H05B 45/37* (2020.01)

(52) U.S. Cl.
CPC ............ *H05B 45/50* (2020.01); *H05B 45/37* (2020.01)

(58) Field of Classification Search
None
See application file for complete search history.

(56) References Cited

U.S. PATENT DOCUMENTS

| 2015/0257211 A1* | 9/2015 | Johnson | .................... F21K 9/00 315/121 |
| 2016/0234900 A1* | 8/2016 | Bendtsen | ............... H05B 45/12 |

* cited by examiner

*Primary Examiner* — Anh Q Tran
(74) *Attorney, Agent, or Firm* — Li & Cai Intellectual Property Office (57) ABSTRACT

An LED illumination device for improving anti-surge capability includes a circuit substrate, a bridge rectifier chip, a surge absorber group, a first anti-surge current-limiting chip group, a second anti-surge current-limiting chip group, an LED illuminating group, and an LED current-limiting group. The surge absorber group is disposed on the circuit substrate and electrically connected to the bridge rectifier chip for absorbing a surge voltage. The first anti-surge current-limiting chip group is disposed on the circuit substrate for absorbing a first predetermined surge voltage. The second anti-surge current-limiting chip group is disposed on the circuit substrate for absorbing a second predetermined surge voltage. The LED illuminating group includes a plurality of LED chips disposed on the circuit substrate. The LED current-limiting group is disposed on the circuit substrate for controlling a total harmonic distortion of current (THDi) of the LED illuminating group.

10 Claims, 6 Drawing Sheets

LED ILLUMINATION DEVICE FOR IMPROVING ANTI-SURGE CAPABILITY

CROSS-REFERENCE TO RELATED PATENT APPLICATION

This application claims the benefit of priority to Taiwan Patent Application No. 111201636, filed on Feb. 17, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light-emitting diode (LED) illumination device, and more particularly to an LED illumination device for improving anti-surge capability.

BACKGROUND OF THE DISCLOSURE

In the related art, when the LED illumination device suddenly receives a surge voltage or a surge current, a plurality of LED chips of the LED illumination device will be damaged due to excessive surge voltage or excessive surge current.

SUMMARY OF THE DISCLOSURE

In response to the above-referenced technical inadequacy, the present disclosure provides an LED illumination device for improving anti-surge capability.

In one aspect, the present disclosure provides an LED illumination device for improving anti-surge capability, which includes a circuit substrate, a bridge rectifier chip, a surge absorber group, a first anti-surge current-limiting chip group, a second anti-surge current-limiting chip group, an LED illuminating group, and an LED current-limiting group. The bridge rectifier chip is disposed on the circuit substrate for converting an alternating current provided by a power supply into a direct current. The surge absorber group is disposed on the circuit substrate and electrically connected between the bridge rectifier chip and a power input terminal for absorbing a surge voltage. The first anti-surge current-limiting chip group is disposed on the circuit substrate for absorbing a first predetermined surge voltage. The second anti-surge current-limiting chip group is disposed on the circuit substrate for absorbing a second predetermined surge voltage. The LED illuminating group includes a plurality of LED chips, and the LED chips are disposed on the circuit substrate and electrically connected to one of the bridge rectifier chip, the first anti-surge current-limiting chip group and the second anti-surge current-limiting chip group. The LED current-limiting group is disposed on the circuit substrate and electrically connected to one of the bridge rectifier chip, the first anti-surge current-limiting chip group and the second anti-surge current-limiting chip group for controlling a total harmonic distortion of current (THDi) of the LED illuminating group. The first anti-surge current-limiting chip group, the second anti-surge current-limiting chip group, the LED illuminating group, and the LED current-limiting group are arranged in series. When a surge signal is input from the power input terminal to the LED illumination device, the surge absorber group, the first anti-surge current-limiting chip group, and the second anti-surge current-limiting chip group are selectively configured for absorbing a surge voltage generated by the surge signal.

In another aspect, the present disclosure provides an LED illumination device for improving anti-surge capability, which includes a circuit substrate, a bridge rectifier chip, a surge absorber group, a first anti-surge current-limiting chip group, a second anti-surge current-limiting chip group, an LED illuminating group, and an LED current-limiting group. The bridge rectifier chip is disposed on the circuit substrate for converting an alternating current provided by a power supply into a direct current. The surge absorber group is disposed on the circuit substrate and electrically connected between the bridge rectifier chip and a power input terminal for absorbing a surge voltage. The first anti-surge current-limiting chip group is disposed on the circuit substrate for absorbing a first predetermined surge voltage. The second anti-surge current-limiting chip group is disposed on the circuit substrate for absorbing a second predetermined surge voltage. The LED illuminating group includes a plurality of LED chips, and the LED chips are disposed on the circuit substrate and electrically connected to one of the bridge rectifier chip, the first anti-surge current-limiting chip group and the second anti-surge current-limiting chip group. The LED current-limiting group is disposed on the circuit substrate and electrically connected to one of the bridge rectifier chip, the first anti-surge current-limiting chip group and the second anti-surge current-limiting chip group for controlling a total harmonic distortion of current (THDi) of the LED illuminating group.

In yet another aspect, the present disclosure provides an LED illumination device for improving anti-surge capability, which includes a circuit substrate, a bridge rectifier chip, a surge absorber group, a first anti-surge current-limiting chip group, a second anti-surge current-limiting chip group, an LED illuminating group, and an LED current-limiting group. The bridge rectifier chip is disposed on the circuit substrate. The surge absorber group is disposed on the circuit substrate and electrically connected to the bridge rectifier chip for absorbing a surge voltage. The first anti-surge current-limiting chip group is disposed on the circuit substrate for absorbing a first predetermined surge voltage. The second anti-surge current-limiting chip group is disposed on the circuit substrate for absorbing a second predetermined surge voltage. The LED illuminating group includes a plurality of LED chips disposed on the circuit substrate. The LED current-limiting group is disposed on the circuit substrate. The first anti-surge current-limiting chip group, the second anti-surge current-limiting chip group, the LED illuminating group, and the LED current-limiting group are arranged in series.

In certain embodiments, when the surge voltage generated by the surge signal is greater than a sum of the surge voltage that is able to be absorbed by the surge absorber group and the first predetermined surge voltage that is able to be absorbed by the first anti-surge current-limiting chip group, the surge absorber group, the first anti-surge current-limiting chip group, and the second anti-surge current-limiting chip group are configured for absorbing the surge voltage generated by the surge signal.

In certain embodiments, when the surge voltage generated by the surge signal is greater than the surge voltage that is able to be absorbed by the surge absorber group and smaller than a sum of the surge voltage that is able to be absorbed by the surge absorber group and the first predetermined surge voltage that is able to be absorbed by the first anti-surge current-limiting chip group, the surge absorber group and the first anti-surge current-limiting chip group are configured for absorbing the surge voltage generated by the surge signal.

In certain embodiments, when the surge absorber group fails due to damage and the surge voltage generated by the surge signal is smaller than the first predetermined surge voltage that is able to be absorbed by the first anti-surge current-limiting chip group, the first anti-surge current-limiting chip group is configured for absorbing the surge voltage generated by the surge signal.

In certain embodiments, when the surge absorber group fails due to damage and the surge voltage generated by the surge signal is greater than the first predetermined surge voltage that is able to be absorbed by the first anti-surge current-limiting chip group, the first anti-surge current-limiting chip group and the second anti-surge current-limiting chip group are configured for absorbing the surge voltage generated by the surge signal.

In certain embodiments, a sum of the first predetermined surge voltage that is able to be absorbed by the first anti-surge current-limiting chip group and the second predetermined surge voltage that is able to be absorbed by the second anti-surge current-limiting chip group is greater than the surge voltage that is able to be absorbed by the surge absorber group.

In certain embodiments, the power input terminal has a live wire, a neutral wire and a ground wire, and the surge absorber group includes a first surge absorber, a second surge absorber and a third surge absorber. The first surge absorber is electrically connected between the live wire and the ground wire to serve as a first surge protection for both the live wire and the ground wire. The second surge absorber is electrically connected between the neutral wire and the ground wire to serve as a second surge protection for both the neutral wire and the ground wire. The third surge absorber is electrically connected between the live wire and the neutral wire to serve as a third surge protection for both the live wire and the neutral wire. A fuse is electrically connected between the live wire and the bridge rectifier chip.

In certain embodiments, the first anti-surge current-limiting chip group includes at least three first anti-surge current-limiting chips and at least three first resistor chips, and the at least three first anti-surge current-limiting chips are respectively electrically connected to the at least three first resistor chips.

In certain embodiments, the second anti-surge current-limiting chip group includes at least three second anti-surge current-limiting chips and at least three second resistor chips, and the at least three second anti-surge current-limiting chips are respectively electrically connected to the at least three second resistor chips.

In certain embodiments, the LED current-limiting group includes at least three LED current-limiting chips and at least three current-limiting resistor chips, and the at least three LED current-limiting chips are respectively electrically connected to the at least three current-limiting resistor chips.

Therefore, in the LED illumination device provided by the present disclosure, by virtue of the surge absorber group being disposed on the circuit substrate and electrically connected to the bridge rectifier chip for absorbing a surge voltage, the first anti-surge current-limiting chip group being disposed on the circuit substrate for absorbing a first predetermined surge voltage, the second anti-surge current-limiting chip group being disposed on the circuit substrate for absorbing a second predetermined surge voltage, the LED current-limiting group being disposed on the circuit substrate for controlling a total harmonic distortion of current (THDi) of the LED illuminating group, and the first anti-surge current-limiting chip group, the second anti-surge current-limiting chip group, the LED illuminating group, and the LED current-limiting group being arranged in series, when a surge signal is input from the power input terminal to the LED illumination device, the surge absorber group, the first anti-surge current-limiting chip group, and the second anti-surge current-limiting chip group can be selectively configured for absorbing a surge voltage generated by the surge signal.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 6, the present disclosure provides an LED illumination device D for improving anti-surge capability, which includes a circuit substrate 1, a bridge rectifier chip 2, a surge absorber group 3, a first anti-surge current-limiting chip group 4, a second anti-surge current-limiting chip group 5, an LED illuminating group 6, and an LED current-limiting group 7. More particularly, the bridge rectifier chip 2 is disposed on the circuit substrate 1. The surge absorber group 3 is disposed on the circuit substrate 1 and electrically connected to the bridge rectifier chip 2 for absorbing a surge voltage. The first anti-surge current-limiting chip group 4 is disposed on the circuit substrate 1 for absorbing a first predetermined surge voltage. The second anti-surge current-limiting chip group 5 is disposed on the circuit substrate 1 for absorbing a second predetermined surge voltage. The LED illuminating group 6 includes a plurality of LED chips 60 disposed on the circuit substrate 1. The LED current-limiting group 7 is disposed on the circuit substrate 1. In addition, the first anti-surge current-limiting chip group 4, the second anti-surge current-limiting chip group 5, the LED illuminating group 6, and the LED current-limiting group 7 are arranged in series. Therefore, when a surge signal S is suddenly input from a power input terminal to the LED illumination device D, the surge absorber group 3, the first anti-surge current-limiting chip group 4, and the second anti-surge current-limiting chip group 5 can be selectively configured for absorbing a surge voltage generated by the surge signal S.

First Embodiment

Referring to FIG. 1 to FIG. 4, a first embodiment of the present disclosure provides an LED illumination device D for improving anti-surge capability, which includes a circuit substrate 1, a bridge rectifier chip 2, a surge absorber group 3, a first anti-surge current-limiting chip group 4, a second anti-surge current-limiting chip group 5, an LED illuminating group 6, and an LED current-limiting group 7.

Figure 1:
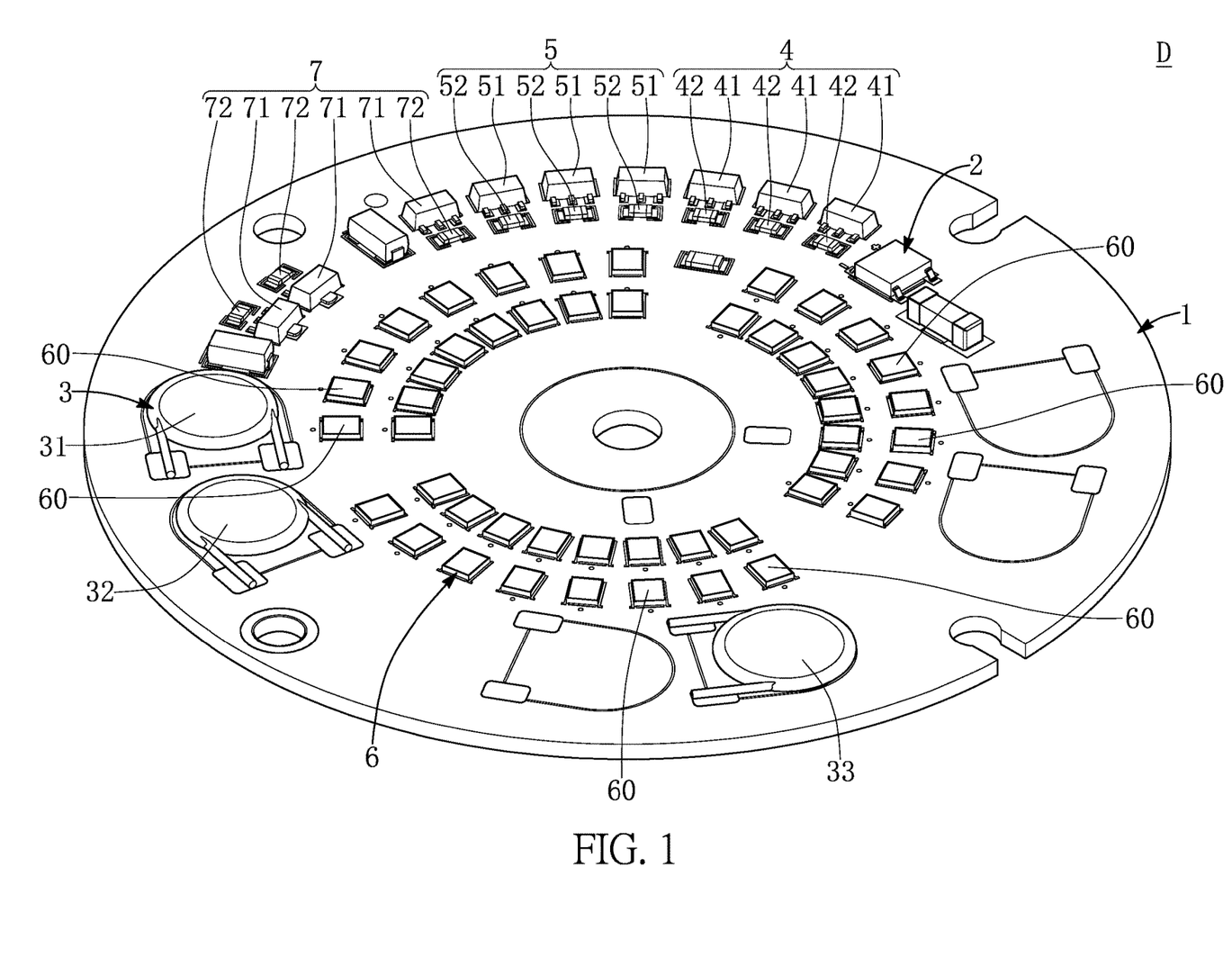
FIG. 1 is a schematic perspective view of an LED illumination device for improving anti-surge capability according to a first embodiment of the present disclosure.
Figure 2:
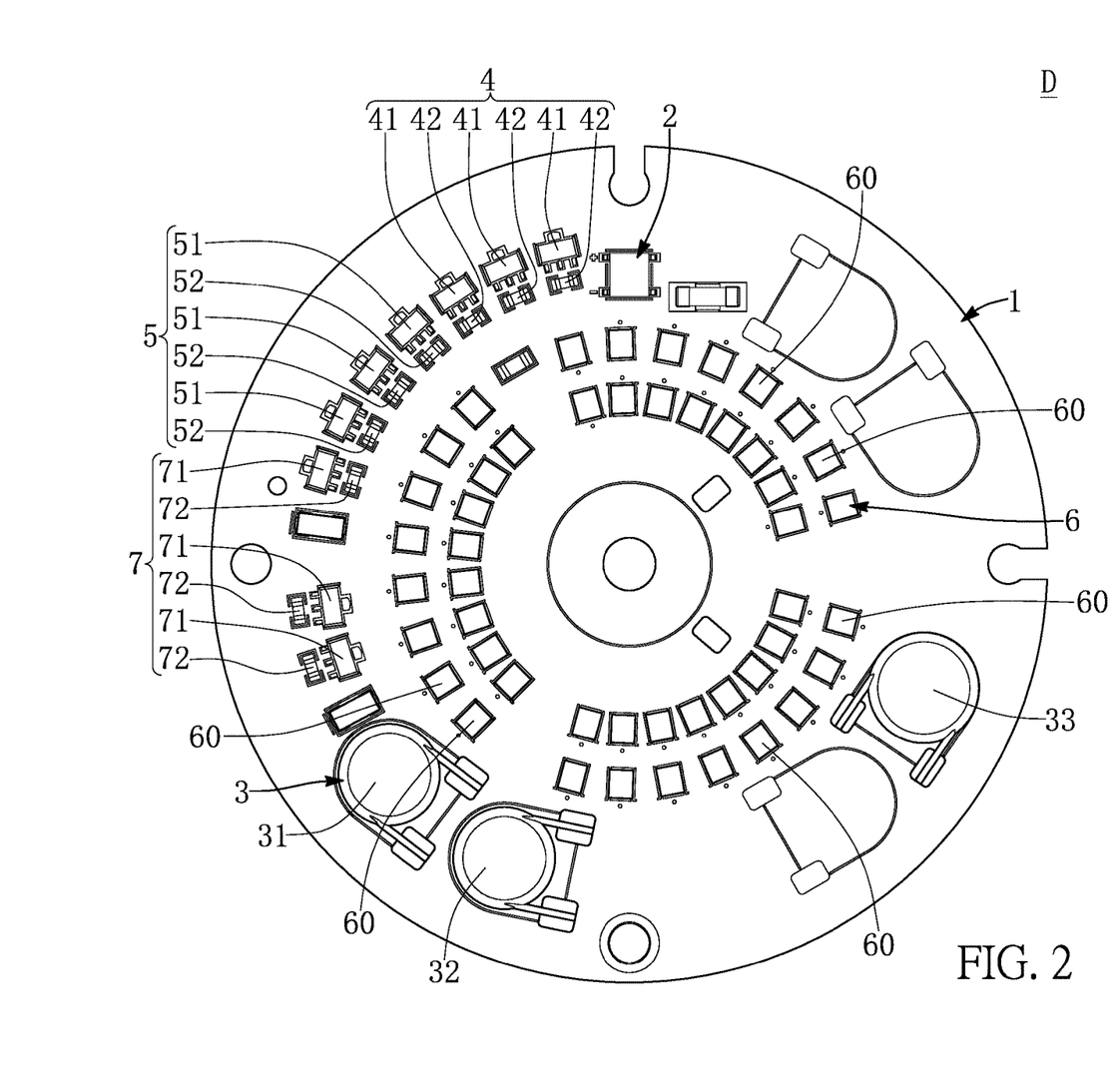
FIG. 2 is a schematic top view of the LED illumination device for improving anti-surge capability according to the first embodiment of the present disclosure.
Figure 3:
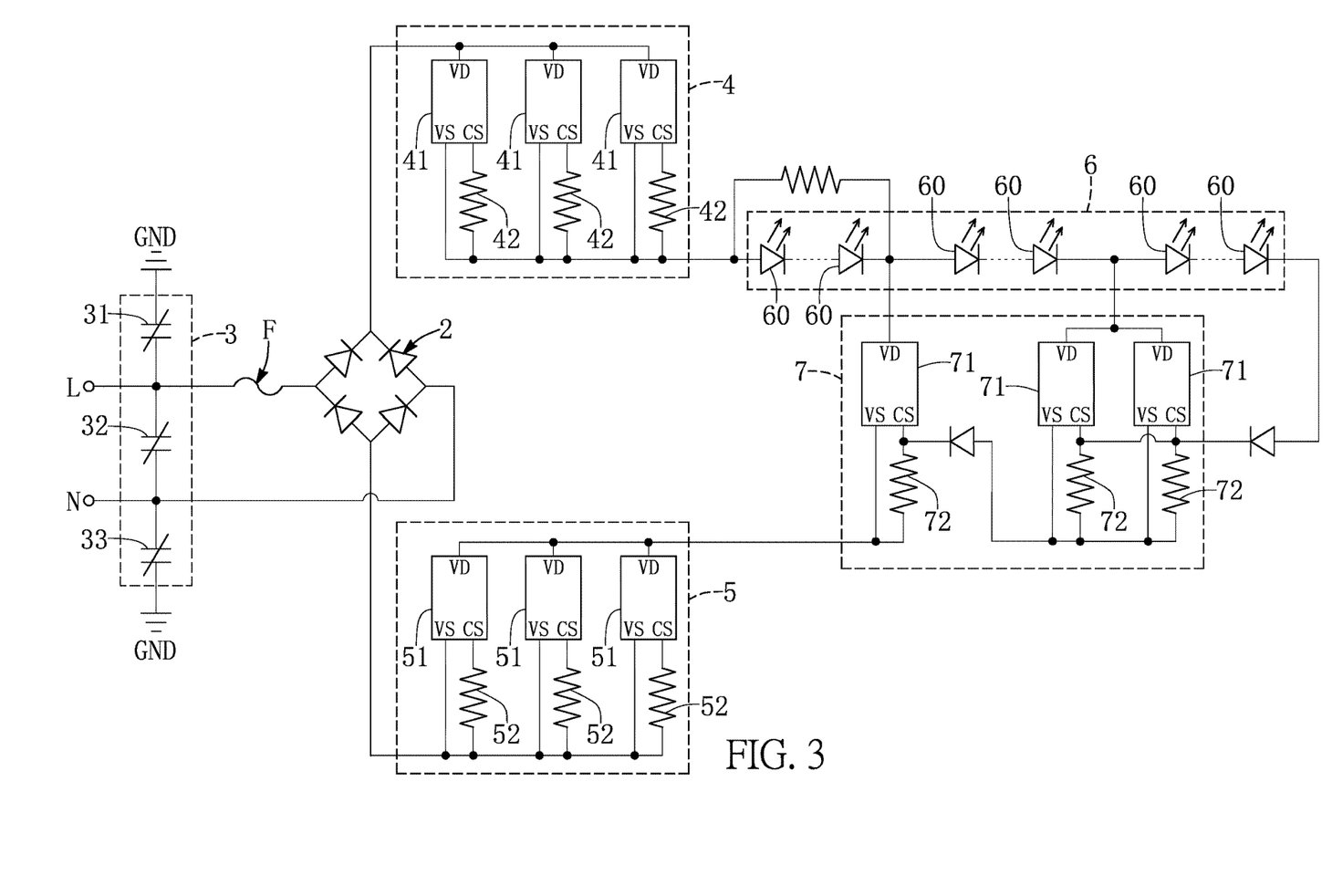
FIG. 3 is a schematic circuit diagram of the LED illumination device for improving anti-surge capability according to the first embodiment of the present disclosure.
Figure 4:
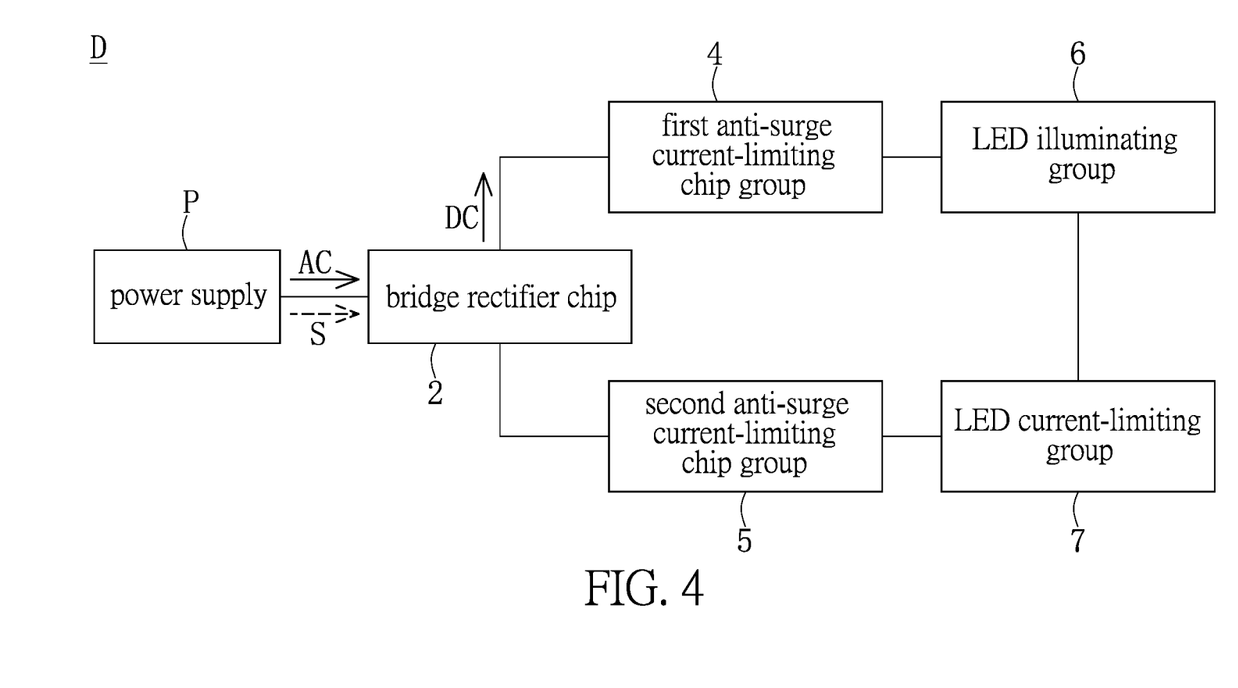
FIG. 4 is a functional block diagram of the LED illumination device for improving anti-surge capability according to the first embodiment of the present disclosure.

Firstly, referring to FIG. 2, FIG. 3 and FIG. 4, the bridge rectifier chip 2 can be configured to be disposed on the circuit substrate 1 for converting an alternating current AC provided by a power supply P into a direct current DC. For example, the bridge rectifier chip 2 (or a chip-type bridge rectifier) is electrically connected to the circuit substrate 1, and the bridge rectifier chip 2 can be any electronic component for converting an alternating current into a direct current so as to provide the direct current required by the LED illumination device D. However, the aforementioned details are disclosed for exemplary purposes only, and are not meant to limit the scope of the present disclosure.

Moreover, referring to FIG. 2 and FIG. 3, the surge absorber group 3 can be configured to be disposed on the circuit substrate 1 and electrically connected between the bridge rectifier chip 2 and a power input terminal for absorbing a surge voltage (or a voltage of a voltage surge). For example, the power input terminal has a live wire L (or a fire wire), a neutral wire N (or a zero wire) and a ground wire GND (or an earth wire), and the surge absorber group 3 includes a first surge absorber 31 (or a first anti-surge element), a second surge absorber 32 (or a second anti-surge element) and a third surge absorber 33 (or a third anti-surge element). In addition, the first surge absorber 31 can be electrically connected between the live wire L and the ground wire GND to serve as a first surge protection for both the live wire L and the ground wire GND. The second surge absorber 32 can be electrically connected between the neutral wire N and the ground wire GND to serve as a second surge protection for both the neutral wire N and the ground wire GND. The third surge absorber 33 can be electrically connected between the live wire L and the neutral wire N to serve as a third surge protection for both the live wire L and the neutral wire N. It should be noted that a fuse F is further electrically connected between the live wire L and the bridge rectifier chip 2. However, the aforementioned details are disclosed for exemplary purposes only, and are not meant to limit the scope of the present disclosure.

Furthermore, referring to FIG. 2 and FIG. 3, the first anti-surge current-limiting chip group 4 can be configured to be disposed on the circuit substrate 1 for absorbing a first predetermined surge voltage (or a first predetermined voltage surge). For example, the first anti-surge current-limiting chip group 4 includes at least three first anti-surge current-limiting chips 41 (or a first current-limiting chip for absorbing surge) and at least three first resistor chips 42, and the at least three first anti-surge current-limiting chips 41 are respectively electrically connected to the at least three first resistor chips 42. It should be noted that the parallel number of the first anti-surge current-limiting chips 41 can limit the maximum current of the LED illumination device D. However, the aforementioned details are disclosed for exemplary purposes only, and are not meant to limit the scope of the present disclosure.

In addition, referring to FIG. 2 and FIG. 3, the second anti-surge current-limiting chip group 5 can be configured to be disposed on the circuit substrate 1 for absorbing a second predetermined surge voltage (or a second predetermined voltage surge). For example, the second anti-surge current-limiting chip group 5 includes at least three second anti-surge current-limiting chips 51 (or a second current-limiting chip for absorbing surge) and at least three second resistor chips 52, and the at least three second anti-surge current-limiting chips 51 are respectively electrically connected to the at least three second resistor chips 52. It should be noted that the parallel number of the second anti-surge current-limiting chips 51 can limit the maximum current of the LED illumination device D. However, the aforementioned details are disclosed for exemplary purposes only, and are not meant to limit the scope of the present disclosure.

Moreover, referring to FIG. 2 and FIG. 3, the LED illuminating group 6 includes a plurality of LED chips 60, and the LED chips 60 can be configured to be disposed on the circuit substrate 1 and electrically connected between the first anti-surge current-limiting chip group 4 and the second anti-surge current-limiting chip group 5. For example, the LED chips 60 can be used to provide light sources of the same or different wavelengths. However, the aforementioned details are disclosed for exemplary purposes only, and are not meant to limit the scope of the present disclosure.

Furthermore, referring to FIG. 2 and FIG. 3, the LED current-limiting group 7 can be configured to be disposed on the circuit substrate 1 and electrically connected between the LED illuminating group 6 and the second anti-surge current-limiting chip group 5 for controlling a total harmonic distortion of current (THDi) of the LED illuminating group 6. For example, the LED current-limiting group 7 includes at least three LED current-limiting chips 71 and at least three current-limiting resistor chips 72, and the at least three LED current-limiting chips 71 are respectively electrically connected to the at least three current-limiting resistor chips 72. It should be noted that the first anti-surge current-limiting chip group 4, the second anti-surge current-limiting chip group 5, the LED illuminating group 6, and the LED current-limiting group 7 are arranged in series. However, the aforementioned details are disclosed for exemplary purposes only, and are not meant to limit the scope of the present disclosure.

Therefore, when a surge signal S (or a voltage surge) is suddenly input from the power input terminal to the LED illumination device D, the surge absorber group 3, the first anti-surge current-limiting chip group 4, and the second anti-surge current-limiting chip group 5 can be selectively configured for absorbing a surge voltage generated by the surge signal S.

For example, when the surge voltage (such as a voltage surge of 1700V) generated by the surge signal S is greater than a sum of the surge voltage (such as a voltage surge of 1000V) that is able to be absorbed by the surge absorber group 3 (such as a varistor) and the first predetermined surge voltage (such as a voltage surge of 500V) that is able to be absorbed by the first anti-surge current-limiting chip group 4 (i.e., when 1700V>1000V+500V), all of the surge absorber group 3 (such as for providing a surge protection of 1000V), the first anti-surge current-limiting chip group 4 (such as for providing a surge protection of 500V), and the second anti-surge current-limiting chip group 5 (such as for providing a surge protection of 500V) need to be configured for absorbing the surge voltage (such as the voltage surge of 1700V) generated by the surge signal S. However, the aforementioned details are disclosed for exemplary purposes only, and are not meant to limit the scope of the present disclosure.

For example, when the surge voltage (such as a voltage surge of 1300V) generated by the surge signal S is greater than the surge voltage (such as a voltage surge of 1000V) that is able to be absorbed by the surge absorber group 3 and smaller than a sum of the surge voltage (such as a voltage surge of 1000V) that is able to be absorbed by the surge absorber group 3 and the first predetermined surge voltage (such as a voltage surge of 500V) that is able to be absorbed by the first anti-surge current-limiting chip group 4 (i.e., when 1300V>1000V, and 1300V<1000V+500V), all of the surge absorber group 3 (such as for providing a surge protection of 1000V) and the first anti-surge current-limiting chip group 4 (such as for providing a surge protection of 500V) need to be configured for absorbing the surge voltage (such as the voltage surge of 1300V) generated by the surge signal S. However, the aforementioned details are disclosed for exemplary purposes only, and are not meant to limit the scope of the present disclosure.

For example, when the surge absorber group 3 fails due to damage and the surge voltage (such as a voltage surge of 400V) generated by the surge signal S is smaller than the first predetermined surge voltage (such as a voltage surge of 500V) that is able to be absorbed by the first anti-surge current-limiting chip group 4 (i.e., when 400V<500V), only the first anti-surge current-limiting chip group 4 (such as for providing a surge protection of 500V) needs to be configured for absorbing the surge voltage (such as the voltage surge of 400V) generated by the surge signal S. However, the aforementioned details are disclosed for exemplary purposes only, and are not meant to limit the scope of the present disclosure.

For example, when the surge absorber group 3 fails due to damage and the surge voltage (such as a voltage surge of 700V) generated by the surge signal S is greater than the first predetermined surge voltage (such as a voltage surge of 500V) that is able to be absorbed by the first anti-surge current-limiting chip group 4 (i.e., when 700V>500V), all of the first anti-surge current-limiting chip group 4 (such as for providing a surge protection of 500V) and the second anti-surge current-limiting chip group 5 (such as for providing a surge protection of 500V) need to be configured for absorbing the surge voltage (such as the voltage surge of 700V) generated by the surge signal S. However, the aforementioned details are disclosed for exemplary purposes only, and are not meant to limit the scope of the present disclosure.

It should be noted that a sum of the first predetermined surge voltage that is able to be absorbed by the first anti-surge current-limiting chip group 4 and the second predetermined surge voltage that is able to be absorbed by the second anti-surge current-limiting chip group 5 is greater than the surge voltage (such as a clamping voltage) that is able to be absorbed by the surge absorber group 3, so that when the surge absorber group 3 fails due to damage, the first anti-surge current-limiting chip group 4, the second anti-surge current-limiting chip group 5, the LED illuminating group 6 and the LED current-limiting group 7 can be prevented from being damaged by a breakdown voltage of the voltage surge.

Second Embodiment

Figure 5:
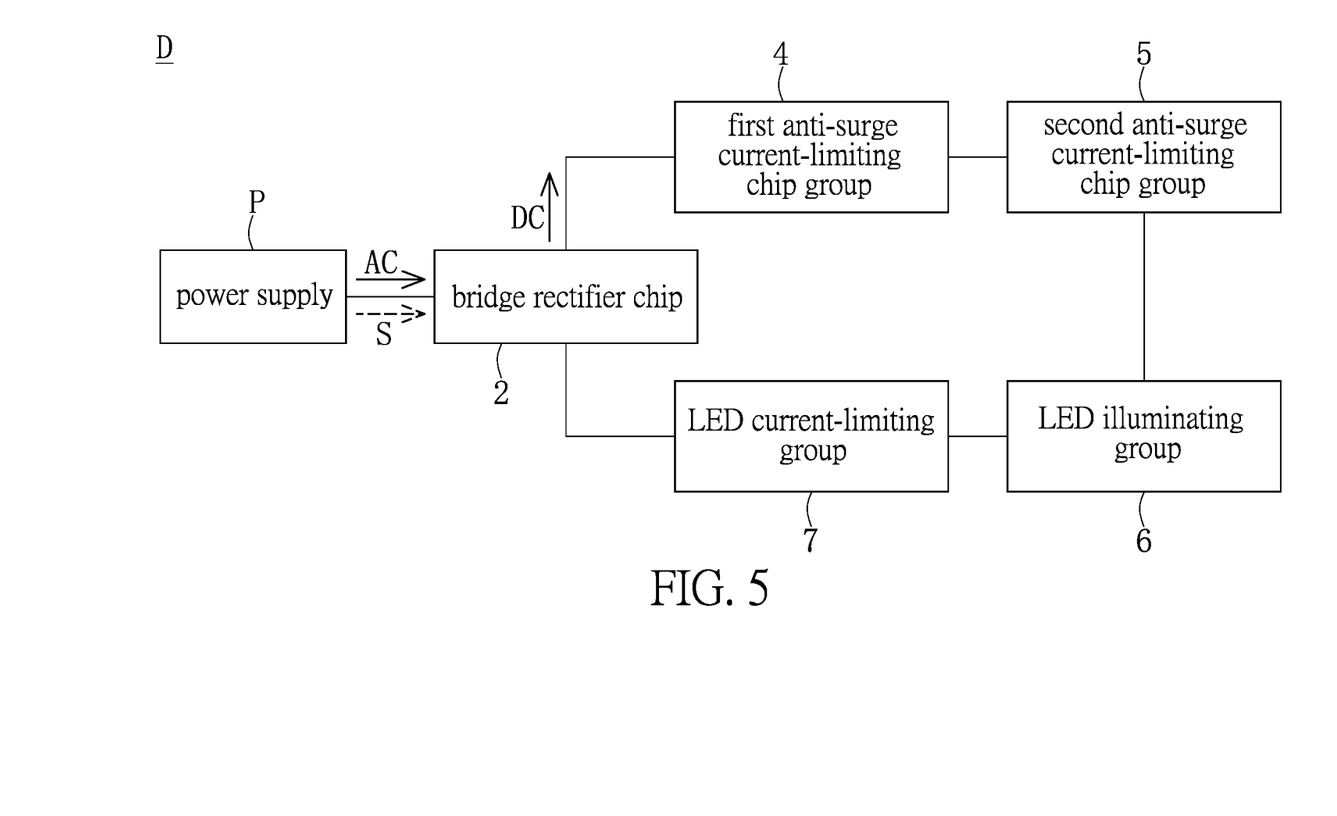
FIG. 5 is a functional block diagram of the LED illumination device for improving anti-surge capability according to a second embodiment of the present disclosure.

Referring to FIG. 5, a second embodiment of the present disclosure provides an LED illumination device D for improving anti-surge capability, which includes a circuit substrate (not shown), a bridge rectifier chip 2, a surge absorber group 3, a first anti-surge current-limiting chip group 4, a second anti-surge current-limiting chip group 5, an LED illuminating group 6, and an LED current-limiting group 7. Comparing FIG. 5 with FIG. 4, the main difference between the second embodiment and the first embodiment is as follows: in the second embodiment, the LED illuminating group 6 is electrically connected between the second anti-surge current-limiting chip group 5 and the LED current-limiting group 7, and the LED current-limiting group 7 is electrically connected between the bridge rectifier chip 2 and the LED illuminating group 6. Therefore, the configuration relationship among the first anti-surge current-limiting chip group 4, the second anti-surge current-limiting chip group 5, the LED illuminating group 6 and the LED current-limiting group 7 can be adjusted according to different requirements.

Third Embodiment

Figure 6:
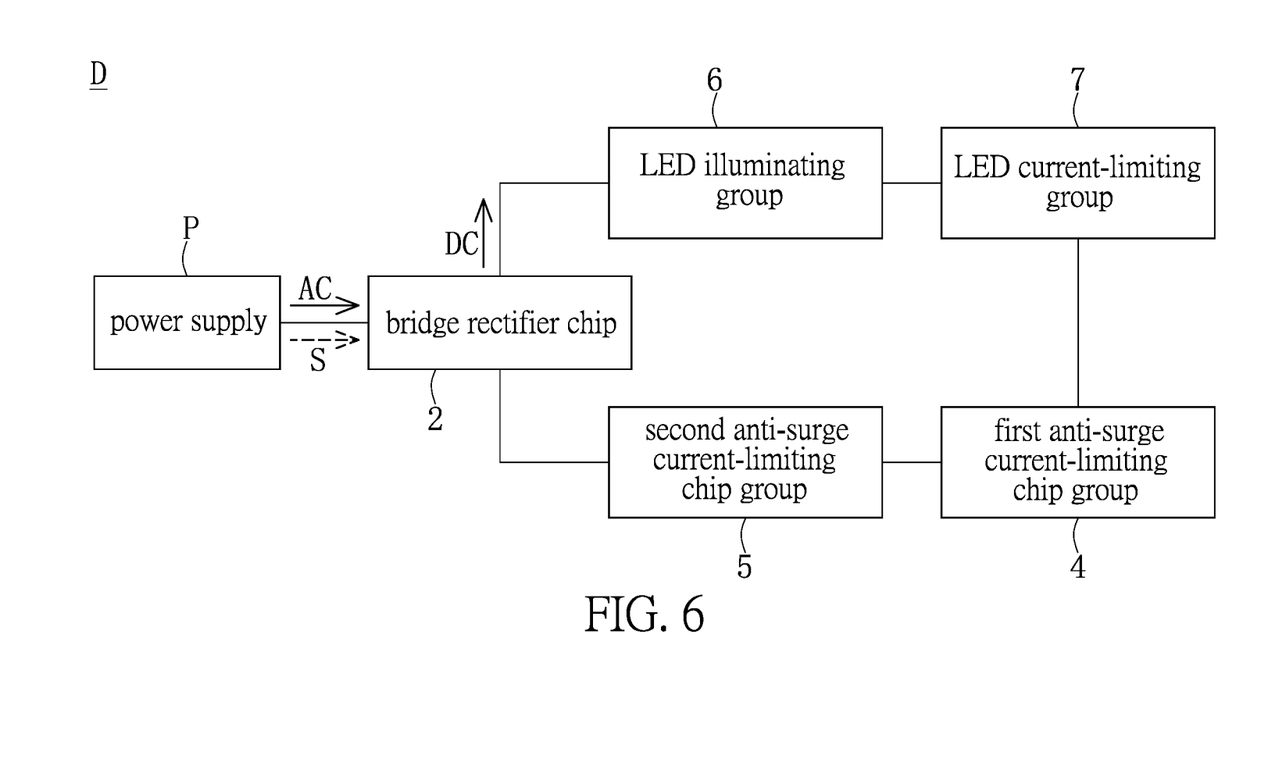
FIG. 6 is a functional block diagram of the LED illumination device for improving anti-surge capability according to a third embodiment of the present disclosure.

Referring to FIG. 6, a third embodiment of the present disclosure provides an LED illumination device D for improving anti-surge capability, which includes a circuit substrate (not shown), a bridge rectifier chip 2, a surge absorber group 3, a first anti-surge current-limiting chip group 4, a second anti-surge current-limiting chip group 5, an LED illuminating group 6, and an LED current-limiting group 7. Comparing FIG. 6 with FIG. 4, the main difference between the third embodiment and the first embodiment is as follows: in the third embodiment, the LED illuminating group 6 is electrically connected between the bridge rectifier chip 2 and the LED current-limiting group 7, and the LED current-limiting group 7 is electrically connected between the LED illuminating group 6 and the first anti-surge current-limiting chip group 4. Therefore, the configuration relationship among the first anti-surge current-limiting chip group 4, the second anti-surge current-limiting chip group 5, the LED illuminating group 6 and the LED current-limiting group 7 can be adjusted according to different requirements.

Beneficial Effects of the Embodiments

In conclusion, in the LED illumination device D provided by the present disclosure, by virtue of the surge absorber group 3 being disposed on the circuit substrate 1 and electrically connected to the bridge rectifier chip 2 for absorbing a surge voltage, the first anti-surge current-limiting chip group 4 being disposed on the circuit substrate 1 for absorbing a first predetermined surge voltage, the second anti-surge current-limiting chip group 5 being disposed on the circuit substrate 1 for absorbing a second predetermined surge voltage, the LED current-limiting group 7 being disposed on the circuit substrate 1 for controlling a total harmonic distortion of current (THDi) of the LED illuminating group 6, and the first anti-surge current-limiting chip group 4, the second anti-surge current-limiting chip group 5, the LED illuminating group 6, and the LED current-limiting group 7 being arranged in series, when a surge signal S is input from the power input terminal to the LED illumination device D, the surge absorber group 3, the first anti-surge current-limiting chip group 4, and the second anti-surge current-limiting chip group 5 can be selectively configured for absorbing a surge voltage generated by the surge signal S.

It should be noted that a sum of the first predetermined surge voltage that is able to be absorbed by the first anti-surge current-limiting chip group 4 and the second predetermined surge voltage that is able to be absorbed by the second anti-surge current-limiting chip group 5 is greater than the surge voltage (such as a clamping voltage) that is able to be absorbed by the surge absorber group 3, so that when the surge absorber group 3 fails due to damage, the first anti-surge current-limiting chip group 4, the second anti-surge current-limiting chip group 5, the LED illuminating group 6 and the LED current-limiting group 7 can be prevented from being damaged by a breakdown voltage of the voltage surge.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An LED illumination device for improving anti-surge capability, comprising:

a circuit substrate;
a bridge rectifier chip disposed on the circuit substrate for converting an alternating current provided by a power supply into a direct current;
a surge absorber group disposed on the circuit substrate and electrically connected between the bridge rectifier chip and a power input terminal for absorbing a surge voltage;
a first anti-surge current-limiting chip group disposed on the circuit substrate for absorbing a first predetermined surge voltage;
a second anti-surge current-limiting chip group disposed on the circuit substrate for absorbing a second predetermined surge voltage;
an LED illuminating group including a plurality of LED chips, wherein the LED chips are disposed on the circuit substrate and electrically connected to one of the bridge rectifier chip, the first anti-surge current-limiting chip group and the second anti-surge current-limiting chip group; and
an LED current-limiting group disposed on the circuit substrate and electrically connected to one of the bridge rectifier chip, the first anti-surge current-limiting chip group and the second anti-surge current-limiting chip group for controlling a total harmonic distortion of current (THDi) of the LED illuminating group;
wherein the first anti-surge current-limiting chip group, the second anti-surge current-limiting chip group, the LED illuminating group, and the LED current-limiting group are arranged in series;
wherein, when a surge signal is input from the power input terminal to the LED illumination device, the surge absorber group, the first anti-surge current-limiting chip group, and the second anti-surge current-limiting chip group are selectively configured for absorbing a surge voltage generated by the surge signal.

2. The LED illumination device according to claim 1,
wherein, when the surge voltage generated by the surge signal is greater than a sum of the surge voltage that is able to be absorbed by the surge absorber group and the first predetermined surge voltage that is able to be absorbed by the first anti-surge current-limiting chip group, the surge absorber group, the first anti-surge current-limiting chip group, and the second anti-surge current-limiting chip group are configured for absorbing the surge voltage generated by the surge signal;
wherein, when the surge voltage generated by the surge signal is greater than the surge voltage that is able to be absorbed by the surge absorber group and smaller than a sum of the surge voltage that is able to be absorbed by the surge absorber group and the first predetermined surge voltage that is able to be absorbed by the first anti-surge current-limiting chip group, the surge absorber group and the first anti-surge current-limiting chip group are configured for absorbing the surge voltage generated by the surge signal;
wherein, when the surge absorber group fails due to damage and the surge voltage generated by the surge signal is smaller than the first predetermined surge voltage that is able to be absorbed by the first anti-surge current-limiting chip group, the first anti-surge current-limiting chip group is configured for absorbing the surge voltage generated by the surge signal;
wherein, when the surge absorber group fails due to damage and the surge voltage generated by the surge signal is greater than the first predetermined surge voltage that is able to be absorbed by the first anti-surge current-limiting chip group, the first anti-surge current-limiting chip group and the second anti-surge current-limiting chip group are configured for absorbing the surge voltage generated by the surge signal;

wherein a sum of the first predetermined surge voltage that is able to be absorbed by the first anti-surge current-limiting chip group and the second predetermined surge voltage that is able to be absorbed by the second anti-surge current-limiting chip group is greater than the surge voltage that is able to be absorbed by the surge absorber group.

3. The LED illumination device according to claim 1, wherein the power input terminal has a live wire, a neutral wire and a ground wire, and the surge absorber group includes a first surge absorber, a second surge absorber and a third surge absorber;

wherein the first surge absorber is electrically connected between the live wire and the ground wire to serve as a first surge protection for both the live wire and the ground wire;

wherein the second surge absorber is electrically connected between the neutral wire and the ground wire to serve as a second surge protection for both the neutral wire and the ground wire;

wherein the third surge absorber is electrically connected between the live wire and the neutral wire to serve as a third surge protection for both the live wire and the neutral wire;

wherein a fuse is electrically connected between the live wire and the bridge rectifier chip.

4. The LED illumination device according to claim 1, wherein the first anti-surge current-limiting chip group includes at least three first anti-surge current-limiting chips and at least three first resistor chips, and the at least three first anti-surge current-limiting chips are respectively electrically connected to the at least three first resistor chips;

wherein the second anti-surge current-limiting chip group includes at least three second anti-surge current-limiting chips and at least three second resistor chips, and the at least three second anti-surge current-limiting chips are respectively electrically connected to the at least three second resistor chips;

wherein the LED current-limiting group includes at least three LED current-limiting chips and at least three current-limiting resistor chips, and the at least three LED current-limiting chips are respectively electrically connected to the at least three current-limiting resistor chips.

5. An LED illumination device for improving anti-surge capability, comprising:

a circuit substrate;

a bridge rectifier chip disposed on the circuit substrate for converting an alternating current provided by a power supply into a direct current;

a surge absorber group disposed on the circuit substrate and electrically connected between the bridge rectifier chip and a power input terminal for absorbing a surge voltage;

a first anti-surge current-limiting chip group disposed on the circuit substrate for absorbing a first predetermined surge voltage;

a second anti-surge current-limiting chip group disposed on the circuit substrate for absorbing a second predetermined surge voltage;

an LED illuminating group including a plurality of LED chips, wherein the LED chips are disposed on the circuit substrate and electrically connected to one of the bridge rectifier chip, the first anti-surge current-limiting chip group and the second anti-surge current-limiting chip group; and an LED current-limiting group disposed on the circuit substrate and electrically connected to one of the bridge rectifier chip, the first anti-surge current-limiting chip group and the second anti-surge current-limiting chip group for controlling a total harmonic distortion of current (THDi) of the LED illuminating group.

6. The LED illumination device according to claim 5, wherein, when the LED illumination device is configured to receive a surge signal, a surge voltage generated by the surge signal is input to the LED illumination device from the power input terminal;

wherein, when the surge voltage generated by the surge signal is greater than a sum of the surge voltage that is able to be absorbed by the surge absorber group and the first predetermined surge voltage that is able to be absorbed by the first anti-surge current-limiting chip group, the surge absorber group, the first anti-surge current-limiting chip group, and the second anti-surge current-limiting chip group are configured for absorbing the surge voltage generated by the surge signal;

wherein, when the surge voltage generated by the surge signal is greater than a sum of the surge voltage that is able to be absorbed by the surge absorber group and the first predetermined surge voltage that is able to be absorbed by the first anti-surge current-limiting chip group, the surge absorber group, the first anti-surge current-limiting chip group, and the second anti-surge current-limiting chip group are configured for absorbing the surge voltage generated by the surge signal;

wherein, when the surge voltage generated by the surge signal is greater than the surge voltage that is able to be absorbed by the surge absorber group and smaller than a sum of the surge voltage that is able to be absorbed by the surge absorber group and the first predetermined surge voltage that is able to be absorbed by the first anti-surge current-limiting chip group, the surge absorber group and the first anti-surge current-limiting chip group are configured for absorbing the surge voltage generated by the surge signal;

wherein, when the surge absorber group fails due to damage and the surge voltage generated by the surge signal is smaller than the first predetermined surge voltage that is able to be absorbed by the first anti-surge current-limiting chip group, the first anti-surge current-limiting chip group is configured for absorbing the surge voltage generated by the surge signal;

wherein, when the surge absorber group fails due to damage and the surge voltage generated by the surge signal is greater than the first predetermined surge voltage that is able to be absorbed by the first anti-surge current-limiting chip group, the first anti-surge current-limiting chip group and the second anti-surge current-limiting chip group are configured for absorbing the surge voltage generated by the surge signal;

wherein a sum of the first predetermined surge voltage that is able to be absorbed by the first anti-surge current-limiting chip group and the second predetermined surge voltage that is able to be absorbed by the second anti-surge current-limiting chip group is greater than the surge voltage that is able to be absorbed by the surge absorber group.

7. The LED illumination device according to claim 5,
wherein the power input terminal has a live wire, a neutral wire and a ground wire, and the surge absorber group includes a first surge absorber, a second surge absorber and a third surge absorber;
wherein the first surge absorber is electrically connected between the live wire and the ground wire to serve as a first surge protection for both the live wire and the ground wire;
wherein the second surge absorber is electrically connected between the neutral wire and the ground wire to serve as a second surge protection for both the neutral wire and the ground wire;
wherein the third surge absorber is electrically connected between the live wire and the neutral wire to serve as a third surge protection for both the live wire and the neutral wire;
wherein a fuse is electrically connected between the live wire and the bridge rectifier chip.

8. The LED illumination device according to claim 5,
wherein the first anti-surge current-limiting chip group includes at least three first anti-surge current-limiting chips and at least three first resistor chips, and the at least three first anti-surge current-limiting chips are respectively electrically connected to the at least three first resistor chips;
wherein the second anti-surge current-limiting chip group includes at least three second anti-surge current-limiting chips and at least three second resistor chips, and the at least three second anti-surge current-limiting chips are respectively electrically connected to the at least three second resistor chips;
wherein the LED current-limiting group includes at least three LED current-limiting chips and at least three current-limiting resistor chips, and the at least three LED current-limiting chips are respectively electrically connected to the at least three current-limiting resistor chips.

9. An LED illumination device for improving anti-surge capability, comprising:
a circuit substrate;
a bridge rectifier chip disposed on the circuit substrate;
a surge absorber group disposed on the circuit substrate and electrically connected to the bridge rectifier chip for absorbing a surge voltage;
a first anti-surge current-limiting chip group disposed on the circuit substrate for absorbing a first predetermined surge voltage;
a second anti-surge current-limiting chip group disposed on the circuit substrate for absorbing a second predetermined surge voltage;
an LED illuminating group including a plurality of LED chips disposed on the circuit substrate; and
an LED current-limiting group disposed on the circuit substrate;
wherein the first anti-surge current-limiting chip group, the second anti-surge current-limiting chip group, the LED illuminating group, and the LED current-limiting group are arranged in series.

10. The LED illumination device according to claim 9,
wherein, when the LED illumination device is configured to receive a surge signal, a surge voltage generated by the surge signal is input to the LED illumination device from a power input terminal;
wherein, when the surge voltage generated by the surge signal is greater than a sum of the surge voltage that is able to be absorbed by the surge absorber group and the first predetermined surge voltage that is able to be absorbed by the first anti-surge current-limiting chip group, the surge absorber group, the first anti-surge current-limiting chip group, and the second anti-surge current-limiting chip group are configured for absorbing the surge voltage generated by the surge signal;
wherein, when the surge voltage generated by the surge signal is greater than a sum of the surge voltage that is able to be absorbed by the surge absorber group and the first predetermined surge voltage that is able to be absorbed by the first anti-surge current-limiting chip group, the surge absorber group, the first anti-surge current-limiting chip group, and the second anti-surge current-limiting chip group are configured for absorbing the surge voltage generated by the surge signal;
wherein, when the surge voltage generated by the surge signal is greater than the surge voltage that is able to be absorbed by the surge absorber group and smaller than a sum of the surge voltage that is able to be absorbed by the surge absorber group and the first predetermined surge voltage that is able to be absorbed by the first anti-surge current-limiting chip group, the surge absorber group and the first anti-surge current-limiting chip group are configured for absorbing the surge voltage generated by the surge signal;
wherein, when the surge absorber group fails due to damage and the surge voltage generated by the surge signal is smaller than the first predetermined surge voltage that is able to be absorbed by the first anti-surge current-limiting chip group, the first anti-surge current-limiting chip group is configured for absorbing the surge voltage generated by the surge signal;
wherein, when the surge absorber group fails due to damage and the surge voltage generated by the surge signal is greater than the first predetermined surge voltage that is able to be absorbed by the first anti-surge current-limiting chip group, the first anti-surge current-limiting chip group and the second anti-surge current-limiting chip group are configured for absorbing the surge voltage generated by the surge signal;
wherein a sum of the first predetermined surge voltage that is able to be absorbed by the first anti-surge current-limiting chip group and the second predetermined surge voltage that is able to be absorbed by the second anti-surge current-limiting chip group is greater than the surge voltage that is able to be absorbed by the surge absorber group;
wherein the power input terminal has a live wire, a neutral wire and a ground wire, and the surge absorber group includes a first surge absorber, a second surge absorber and a third surge absorber;
wherein the first surge absorber is electrically connected between the live wire and the ground wire to serve as a first surge protection for both the live wire and the ground wire;
wherein the second surge absorber is electrically connected between the neutral wire and the ground wire to serve as a second surge protection for both the neutral wire and the ground wire;
wherein the third surge absorber is electrically connected between the live wire and the neutral wire to serve as a third surge protection for both the live wire and the neutral wire;
wherein a fuse is electrically connected between the live wire and the bridge rectifier chip;
wherein the first anti-surge current-limiting chip group includes at least three first anti-surge current-limiting chips and at least three first resistor chips, and the at least three first anti-surge current-limiting chips are respectively electrically connected to the at least three first resistor chips;

wherein the second anti-surge current-limiting chip group includes at least three second anti-surge current-limiting chips and at least three second resistor chips, and the at least three second anti-surge current-limiting chips are respectively electrically connected to the at least three second resistor chips;

wherein the LED current-limiting group includes at least three LED current-limiting chips and at least three current-limiting resistor chips, and the at least three LED current-limiting chips are respectively electrically connected to the at least three current-limiting resistor chips.

* * * * *